(12) United States Patent
Webber et al.

(10) Patent No.: US 6,572,147 B2
(45) Date of Patent: *Jun. 3, 2003

(54) SEAT RESTRAINT TENSIONER

(75) Inventors: James Lloyd Webber, Shelby Township, MI (US); Lloyd Walker Rogers, Jr., Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/016,086

(22) Filed: Dec. 13, 2001

(65) Prior Publication Data

US 2002/0043796 A1 Apr. 18, 2002

Related U.S. Application Data

(63) Continuation of application No. 09/540,623, filed on Mar. 31, 2000, now Pat. No. 6,340,176.

(51) Int. Cl.⁷ .............................................. B60R 22/46
(52) U.S. Cl. ...................................... 280/806; 297/480
(58) Field of Search ................................. 280/806, 805, 280/807; 297/470, 480

(56) References Cited

U.S. PATENT DOCUMENTS

| | | |
|---|---|---|
| 3,871,470 A | 3/1975 | Schwanz et al. |
| 3,889,969 A | 6/1975 | Otani |
| 3,891,271 A | 6/1975 | Fieni |
| 3,999,780 A | 12/1976 | Matsuoka et al. |
| 5,310,220 A | 5/1994 | Föhl |
| 5,405,180 A | 4/1995 | Föhl |
| 5,492,368 A | 2/1996 | Pywell et al. |
| 5,725,249 A | 3/1998 | Nishide et al. |
| 5,829,841 A | 11/1998 | Pywell et al. |
| 5,913,486 A | 6/1999 | Pywell et al. |
| 6,089,492 A | 7/2000 | Nagata et al. |
| 6,113,145 A | 9/2000 | Evans |
| 6,131,951 A | 10/2000 | Chicken et al. |
| 6,149,242 A | 11/2000 | Pesta et al. |
| 6,264,281 B1 * | 7/2001 | Dukatz et al. ............... 297/480 |
| 6,299,211 B1 * | 10/2001 | Wier ........................... 280/806 |

* cited by examiner

Primary Examiner—Paul N. Dickson
Assistant Examiner—Deanna Draper
(74) Attorney, Agent, or Firm—Kathryn A. Marra

(57) ABSTRACT

A seat restraint tensioner for a seat restraint system in a vehicle includes a housing for operative connection to vehicle structure and a movable piston disposed in the housing. The seat restraint tensioner also includes a gas generator operatively connected to the housing for expelling a gas to move the piston. The piston includes a passageway extending therethrough to control a rate of stroke of the piston when the gas is generated to apply a force for pulling-down belt webbing of the seat restraint system.

18 Claims, 6 Drawing Sheets

SEAT RESTRAINT TENSIONER

This is a continuation of application Ser. No. 09/540,623, filed Mar. 31, 2000 now U.S. Pat. No. 6,340,176.

TECHNICAL FIELD

The present invention relates generally to seat restraint systems for vehicles and, more particularly, to a seat restraint tensioner for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a seat belt tensioner in the seat restraint system for tensioning an occupant belt restraint in the event of sudden vehicle deceleration. An example of such a seat belt tensioner is disclosed in U.S. Pat. No. 5,492,368 to Pywell. In this patent, the seat belt tensioner has a housing with a piston slidably mounted therein and a seat belt reel attached to a shaft of the piston. The seat belt tensioner is operated by pushing a piston with pyrotechnically generated gas and mechanically translating that force into seat belt reeling to wind the belt and seat belt tensioning. However, the force applied by the seat belt is highly dependent on the rate of gas generation, which is difficult to control due to variations in operating pressure, surface area and operating temperatures.

It is desirable to provide a seat restraint tensioner for a seat restraint belt or webbing in a seat restraint system of a vehicle. It is also desirable to provide a seat restraint tensioner with load rate control for a seat restraint system of a vehicle. It is further desirable to provide a seat restraint tensioner having a rate of stroke independent of a rate of gas generation for a seat restraint system in a vehicle. It is still further desirable to provide a seat restraint tensioner for a seat restraint system in a vehicle that is less costly and has a smaller package.

SUMMARY OF THE INVENTION

It is, therefore, one object of the present invention to provide a seat restraint tensioner for a seat restraint system in a vehicle.

It is another object of the present invention to provide a seat restraint tensioner for a seat restraint system in a vehicle that applies a force at a controlled rate.

To achieve the foregoing objects, the present invention is a seat restraint tensioner for a seat restraint system in a vehicle including a housing for operative connection to vehicle structure and a movable piston disposed in the housing. The seat restraint tensioner also includes a gas generator operatively connected to the housing for expelling a gas to move the piston. The piston includes a passageway extending therethrough to control a rate of stroke of the piston when the gas is generated to apply a force for pulling-down belt webbing of the seat restraint system.

One advantage of the present invention is that a seat restraint tensioner is provided for a seat restraint system in a vehicle. Another advantage of the present invention is that the seat restraint tensioner has load rate control to pull-down the belt webbing to restrain an occupant in the vehicle. Yet another advantage of the present invention is that the seat restraint tensioner is of a linear type. Still another advantage of the present invention is that the seat restraint tensioner has a rate of stroke independent of a rate of gas generation. A further advantage of the present invention is that the seat restraint tensioner has a relatively low cost, simpler assembly and smaller packaging than current rotary pretensioners.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
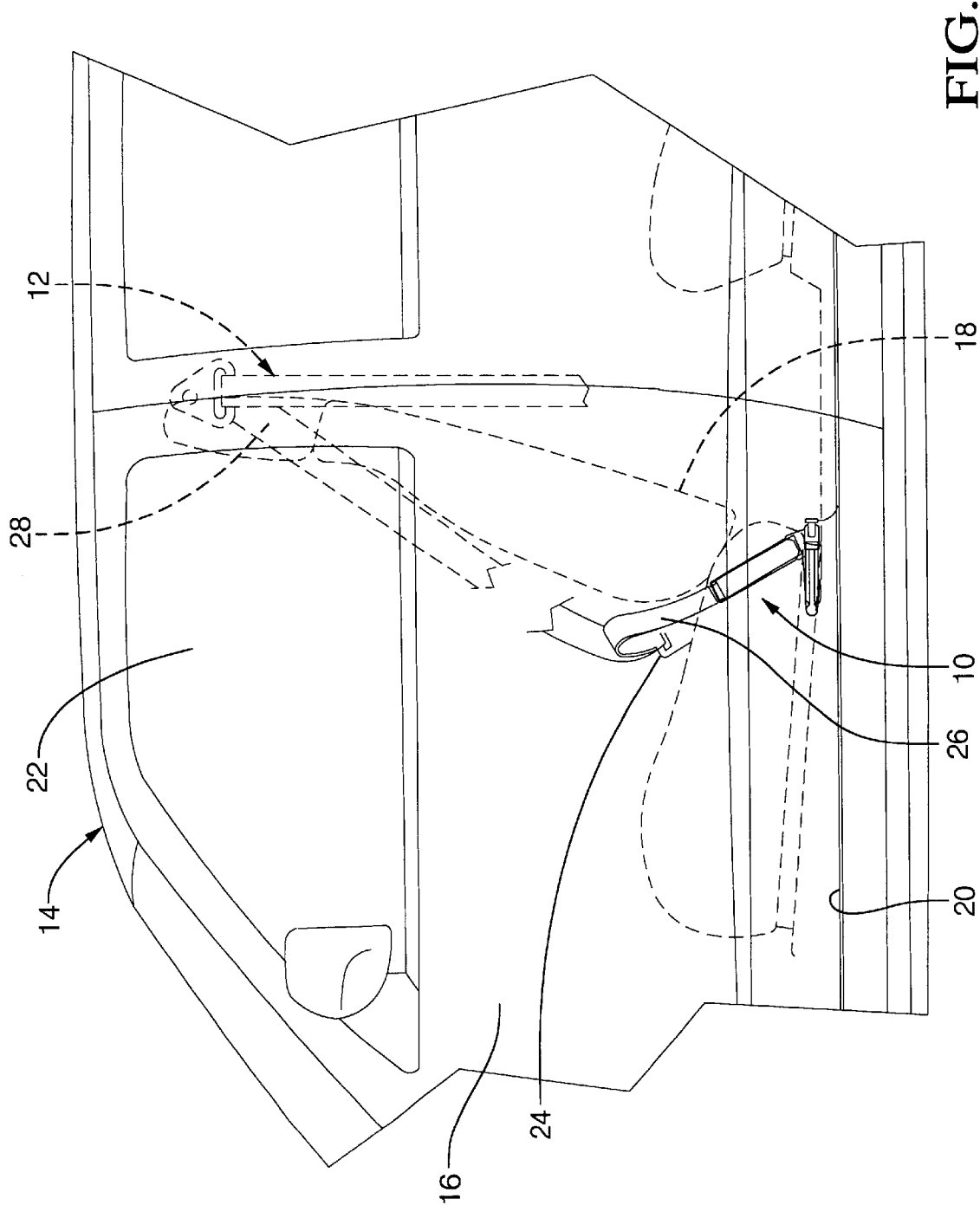
FIG. 1 is an elevational view of a seat restraint tensioner, according to the present invention, illustrated in operational relationship with a seat restraint system of a vehicle.
Figure 3:
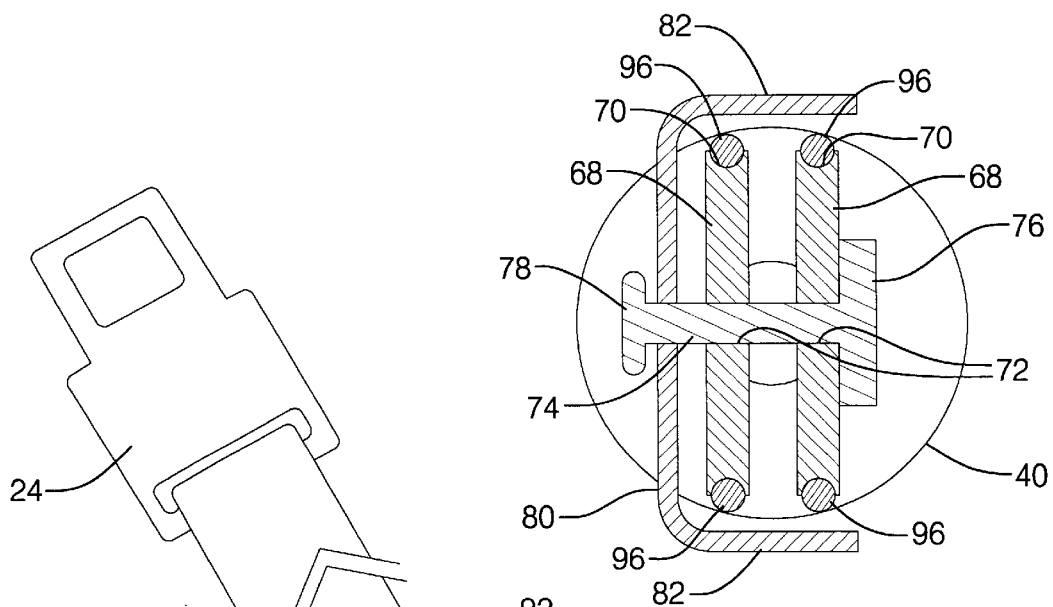
FIG. 3 is a fragmentary end elevational view of a portion of the seat restraint tensioner of FIG. 1.

Referring to the drawings and in particular FIG. 1, one embodiment of a seat restraint tensioner 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row or third row seat for the vehicle 14.

The vehicle 14 includes the seat restraint system 12 for restraining an occupant (not shown) in the seat 18. The seat restraint system 12 includes a latch tongue or plate 24 connected to an end of either one of a lap belt 26, shoulder belt 28, or both. In this embodiment, the shoulder belt 28 has another end connected to a seat belt retractor (not shown). The other end of the lap belt 26 is connected to the seat restraint tensioner 10 to be described. The seat restraint system 12 also includes a buckle assembly (not shown) connected by suitable means such as belt webbing (not shown) to the vehicle structure 20 or the seat 18. The latch plate 24 is engageable and disengageable with the buckle assembly as is known in the art. It should be appreciated that, except for the seat restraint tensioner 10, the seat restraint system 12 and vehicle 14 are conventional and known in the art.

Referring to FIGS. 1 through 4, the seat restraint tensioner 10, according to the present invention, includes a base plate 34 connected to the vehicle structure 20 or seat 18 by suitable means such as an anchor bolt 36. The base plate 34 is generally planar and made of a metal material such as steel. The base plate 34 includes an aperture 38 extending therethrough. The aperture 38 is generally rectangular in shape to allow the belt webbing of the lap belt 26 to extend through which is fastened to itself by suitable means such as stitching. It should be appreciated that the lap belt 26 is securely connected to the base plate 34.

The seat restraint tensioner 10 also includes a housing 40 secured to the base plate 34 by suitable means such as welding. The housing 40 has a first or piston portion 42 extending longitudinally and a second or gas generation portion 44 extending longitudinally from the piston portion 42 at a forward end thereof and having an enlarged diameter. The piston portion 42 and gas generation portion 44 are generally tubular in shape with a generally circular cross-sectional shape. The piston portion 42 has an aperture 46 extending axially through an end thereof for a function to be described. The gas generation portion 44 has an aperture 48 extending axially through an end thereof for a function to be described. The gas generation portion 44 may also have an aperture 50 extending downwardly therethrough for a function to be described. The housing 40 is made of a metal material such as steel.

The seat restraint tensioner 10 includes a piston 52 disposed initially in the gas generation portion 44 of the housing 40. The piston 52 is generally cylindrical in shape for sliding movement in the piston portion 42. The piston 52 has an annular groove 54 and a seal 56 such as an O-ring disposed in the annular groove 54 to form a seal with an interior surface of the piston portion 42 of the housing 40 to prevent gases from escaping past the piston 52. The piston 52 also has a passageway 58 extending therethrough for a function to be described. The piston 52 is made of a metal material such as steel.

The seat restraint tensioner 10 includes a bushing or end cap 60 disposed in the end of the piston portion 42 and having a support portion 62 extending axially through the aperture 46 of the piston portion 42. The end cap 60 also has an aperture 64 extending axially therethrough for a function to be described. The end cap 60 is secured in the piston portion 42 by suitable means such as press fitting. The end cap 60 is made of a metal material such as steel.

The seat restraint tensioner 10 includes a shaft or rod 66 disposed partially in the housing 40. The shaft 66 is generally planar in shape with a generally rectangular cross-sectional shape. The shaft 66 extends longitudinally and has one end connected to the piston 52 by suitable means such as welding and another end extending through the aperture 64 in the end cap 60. The shaft 66 is made of a metal material such as steel. It should be appreciated that the piston 52 and shaft 66 may be integral, unitary, and one-piece.

The seat restraint tensioner 10 includes at least one, preferably a pair of rotatable pulleys 68 disposed on opposed sides of and connected to the end of the shaft 66. The pulleys 68 are generally circular in shape and have an annular groove 70 for a function to be described. The pulleys 68 have an aperture 72 extending therethrough. The seat restraint tensioner 10 includes a pin 74 extending through the apertures 72 in the pulleys 68 and an aperture 75 in the shaft 66. The pin 74 has a head 76 extending radially at one end adjacent one of the pulleys 68 and a head 78 at the other end adjacent a cover member 80. The cover member 80 has a pair of opposed flanges 82 to extend over and cover the pulleys 68. It should be appreciated that the cover member 80 has a general "C" shape.

The seat restraint tensioner 10 also includes a gas generator 84 disposed in the inflator portion 44 of the housing 40. The gas generator 84 is a pyrotechnic device similar to that used for inflators in inflatable restraint systems to expel a gas into the housing 40. The gas generator 84 includes an electrical connector 86 connected to a source of power (not shown) for activating the pyrotechnic device to expel the gas. The gas generator 84 extends through the aperture 48 in the gas generation portion 44 of the housing 40. The seat restraint tensioner 10 includes a generator support or end cap 88 disposed in the end of the gas generation portion 44. The end cap 88 also has an aperture 90 extending longitudinally therethrough to receive the gas generator 84. The end cap 88 is secured in the gas generation portion 44 by suitable means such as press fitting. The end cap 88 is made of a metal material such as steel. It should be appreciated that the gas expelled by the pyrotechnic device of the gas generator 84 will move the piston 52 longitudinally in the piston portion 42 of the housing 40 as illustrated by the arrow in FIG. 5. It should also be appreciated that the gas generator 84 may be a stored compressed gas used with an electrical trigger in place of a pyrotechnic device.

The seat restraint tensioner 10 includes a cable fitting 92 attached to the belt webbing of the lap belt 26 between the base plate 38 and the latch plate 24. The cable fitting 92 has a generally inverted U shape and is a tubular member having an aperture (not shown) extending therethrough. The belt webbing of the lap belt. 26 is fastened to itself by suitable means such as stitching to form a loop 94. The cable fitting 92 extends through the loop 94 for a function to be described. It should be appreciated that the cable fitting 92 is securely connected to the belt webbing of the lap belt 26. It should also be appreciated that the seat restraint tensioner 10 can be mounted on the other or anchor side of the seat 18 and the cable fitting 92 attached to the belt webbing for the buckle assembly.

The seat restraint tensioner 10 also includes at least one cable 96 extending through the aperture of the cable fitting 92 and having one end disposed in the groove 70 and extending over one of the pulleys 68. The end of the cable 96 is connected to the base plate 34 by extending through a flange 97 thereof and retained by a plug member 98. The cable 96 has another end disposed in the groove 70 and extending over the other one of the pulleys 68. The other end of the cable 96 is connected to the base plate 34 by extending through a flange 97 thereof and retained by a plug member 98. The seat restraint tensioner 10 includes at least one, preferably a pair of guide pulleys 100 rotatably secured to the base plate 34 by suitable means such as a pin or fastener 102. The guide pulleys 100 have an annular groove 104 to allow the cable 96 to extend therein and around the guide pulleys 100. The cable 96 is made of a metal material such as steel. The seat restraint tensioner 10 may include a cover (not shown) disposed over a portion of the belt webbing with one end disposed over the loop 94 and cable fitting 92 and the other end disposed over the upper end of the base plate 34.

Figure 2:
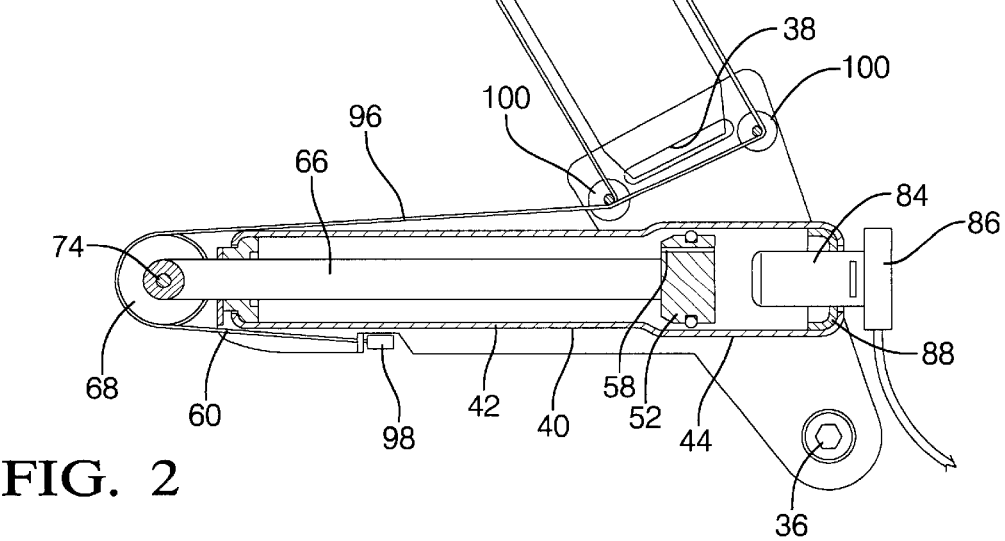
FIG. 2 is an enlarged fragmentary side elevational view of the seat restraint tensioner of FIG. 1.
Figure 4:
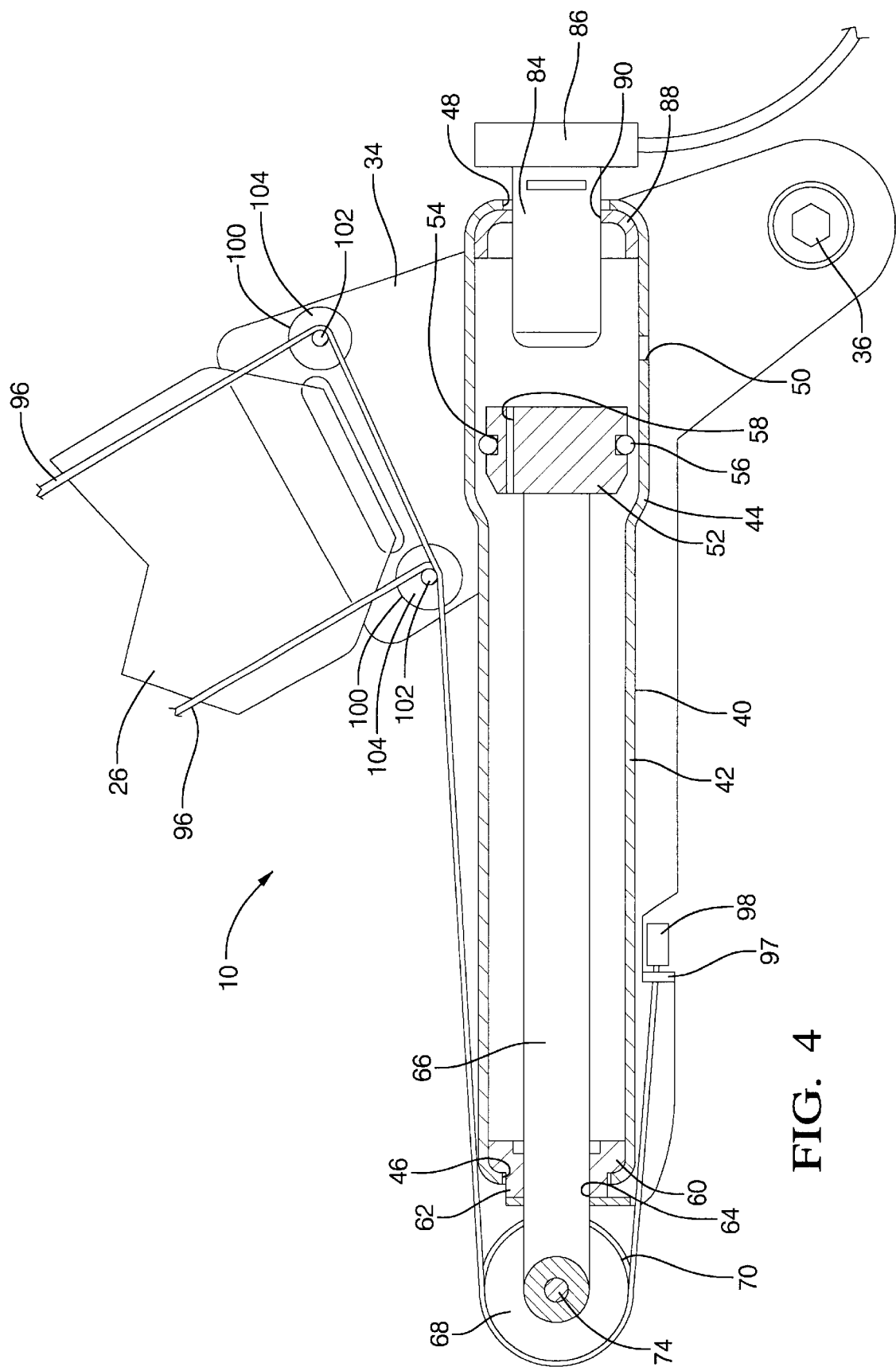
FIG. 4 is an enlarged fragmentary side elevational view of the seat restraint tensioner of FIG. 1 illustrating a first operative position.

In operation of the seat restraint tensioner 10, an occupant (not shown) grasps the latch plate 24 and pulls on the lap belt 26 and shoulder belt 28. The shoulder belt 28 is unwound by the occupant from the retractor. The occupant engages the latch plate 24 with the buckle assembly to restrain the occupant in the seat 18. The seat restraint tensioner 10 is in an initial or first operative position as illustrated in FIGS. 2 and 4.

Figure 5:
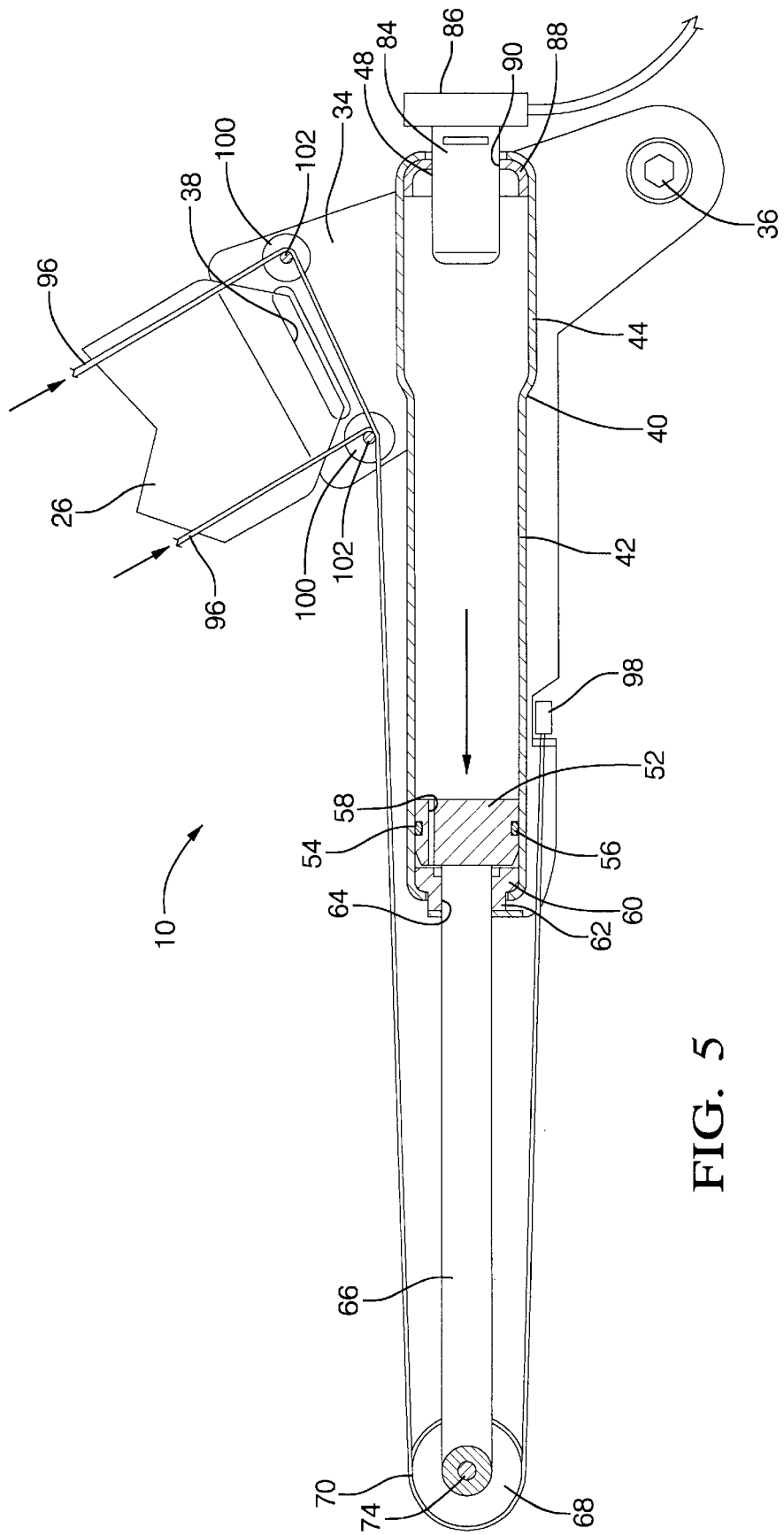
FIG. 5 is a view similar to FIG. 4 of the seat restraint tensioner illustrating a second operative position.
Figure 6:
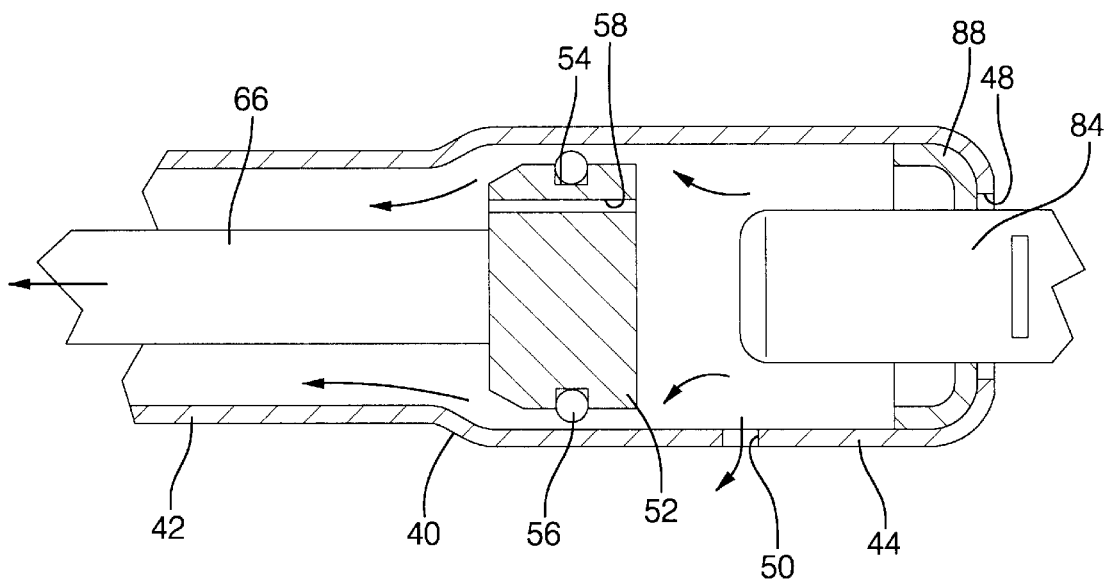
FIG. 6 is a fragmentary side elevational view of a portion of the seat restraint tensioner of FIG. 1 illustrating a first operative position.
Figure 8:
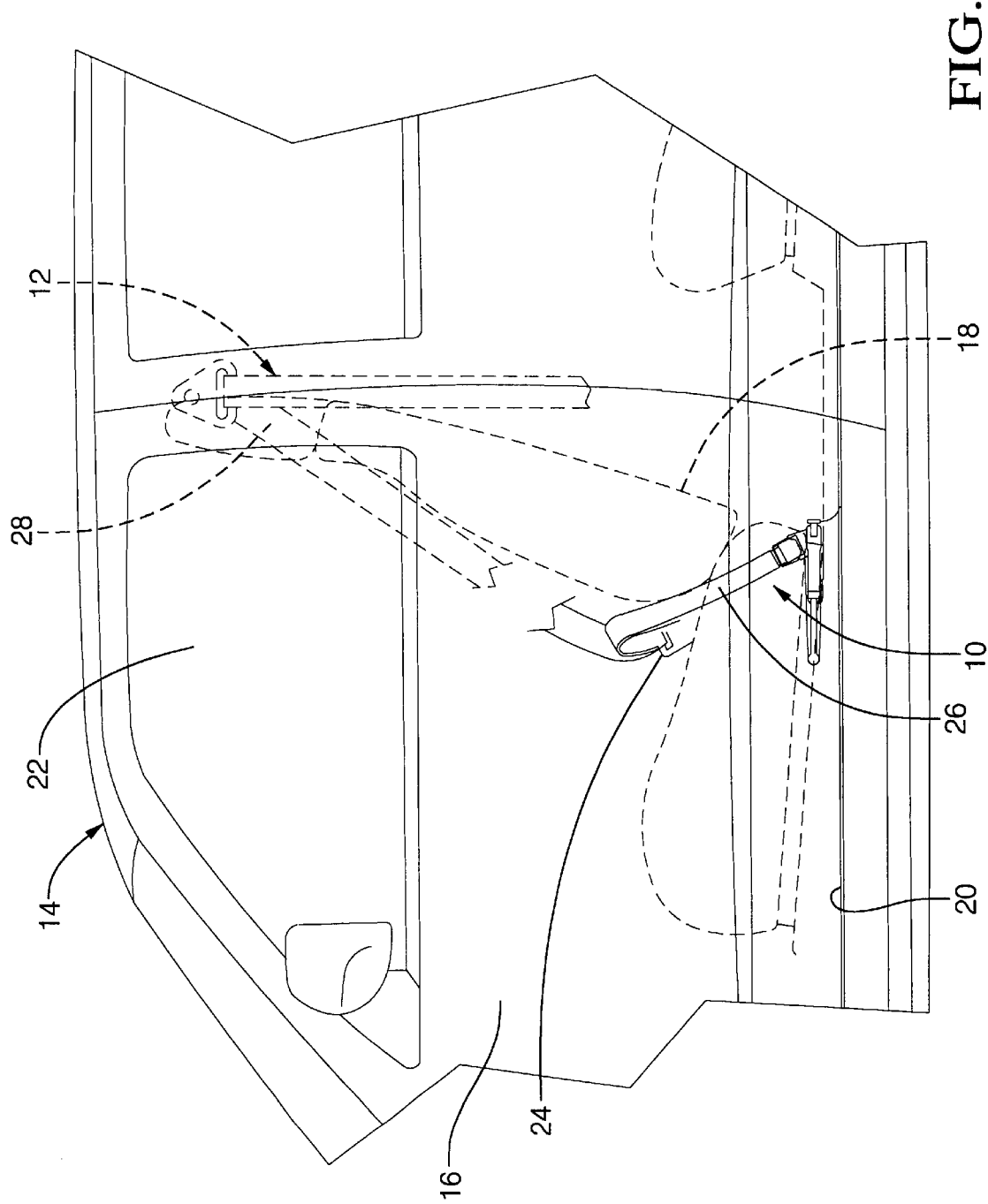
FIG. 8 is a view similar to FIG. 1 illustrating the seat restraint tensioner in an operative condition with the seat restraint system.

When the vehicle 14 experiences a collision-indicating condition of at least a predetermined threshold level, an electrical signal is sent to the gas generator 84. The gas generator 84 is activated and a gas is expelled by the pyrotechnic device into the gas generation portion 44 of the housing 40 as illustrated in FIG. 6. It should be appreciated that the gas is generated very quickly and completely before the piston 52 moves. The force of the gas against the piston 52 causes the piston 52 to move longitudinally in the piston portion 42, in turn, moving the shaft 66 and pulleys 68 rearward, pulling on the cable 96, in turn, pulling on the cable fitting 98 and loop 94 of the belt webbing of the lap belt 26. As the piston 52 moves further longitudinally, the loop 94 and belt webbing of the lap belt 26 are pulled downward in a linear manner toward the base plate 34 to take up slack in the seat restraint system 12 and secure the occupant in the seat 18 as illustrated in FIGS. 5 and 8. It should be appreciated that the force of the gas is mechanically transferred to the belt webbing by pulling on the cable 96.

Figure 7:
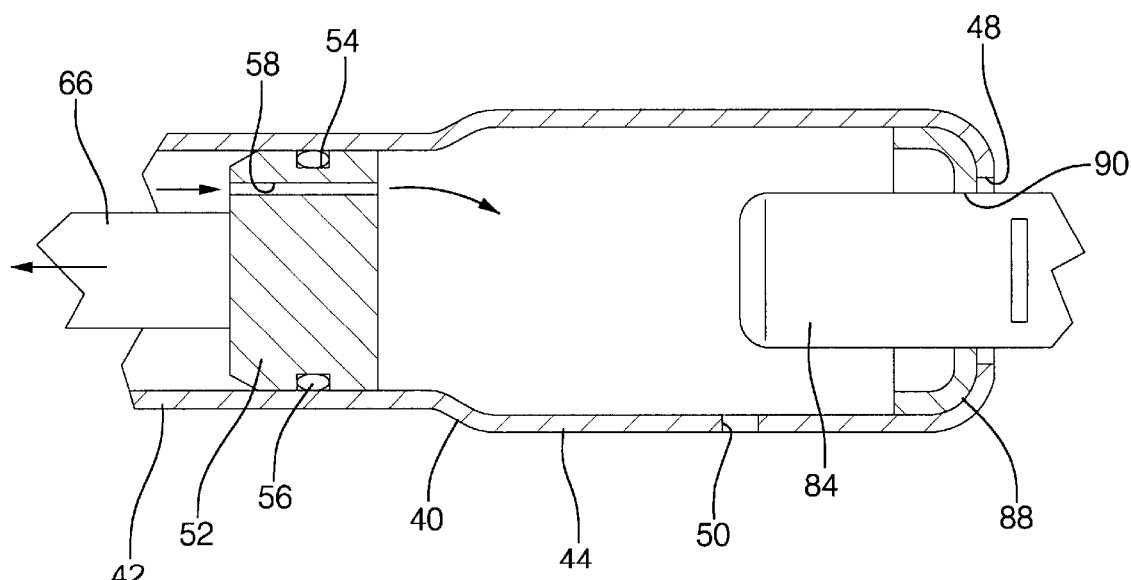
FIG. 7 is a view similar to FIG. 6 of the portion of the seat restraint tensioner illustrating a second operative position.

The force from the gas is the area of the shaft 66 multiplied by the internal pressure of the gas. The force is based on the peak pressure of the gas and independent of the rate of generation of the gas by the gas generator 84. As illustrated in FIG. 6, the gas is expelled by the gas generator 84 as indicated by the arrows and may bleed through the aperture 50 to reduce pressure or the force on the piston 52. As illustrated in FIG. 7, as the piston 52 is moved through the piston portion 42 of the housing 40 and the gas may bleed through the passageway 58 of the piston 52. The rate of stroke of the piston 52 is dependent on the flow of the gas from one side of the piston 52 to the other. The rate of stroke is controlled by the size of the passageway 58 through the piston 52 to allow gas flow. It should be appreciated that, for a rollover condition of the vehicle, the gas generator 84 generates a pressure of approximately 5500 psi and a predetermined force of approximately 3.0 kilonewtons on the piston 52, which travels a predetermined distance such as 100 millimeters, to apply a predetermined force of approximately 1.5 kilonewton on the belt webbing of the lap belt 26 to travel a predetermined distance such as 200 millimeters downward toward the base plate 34. It should also be appreciated that the seat restraint tensioner 10 may be used for a frontal impact condition for pre-loading before the occupant moves to load the belt webbing and is tuned to have a stroke rate much faster than in a rollover condition.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat restraint tensioner for a seat restraint system in a vehicle comprising:

a housing for operative connection to vehicle structure;

a movable piston disposed in said housing;

a shaft extending longitudinally from said piston and through an end of said housing;

at least one pulley rotatably connected to said shaft and disposed outside of said housing;

at least one cable having one end operatively connected to belt webbing of the seat restraint system and another end extending over said at least one pulley and operatively connected to said housing; and a gas generator operatively connected to said housing for expelling a gas to push said piston and said shaft and said at least one pulley, said at least one pulley moving linearly away from said housing for pulling on said at least one cable to pull-down belt webbing of the seat restraint system.

2. A seat restraint tensioner as set forth in claim 1 including a base plate connected to said housing and for operative connection to vehicle structure and the belt webbing.

3. A seat restraint tensioner as set forth in claim 2 including an anchor bolt extending through said base plate for connection to the vehicle structure.

4. A seat restraint tensioner as set forth in claim 1 including a cable fitting for connection to the belt webbing of the seat restraint system and to said at least one cable.

5. A seat restraint tensioner as set forth in claim 1 including at least one guide pulley rotatably connected to said housing, said at least one cable extending around said at least one guide pulley.

6. A seat restraint tensioner as set forth in claim 1 wherein said piston includes an annular groove therein.

7. A seat restraint tensioner as set forth in claim 6 including a seal disposed in said groove to prevent gases from exiting past said piston.

8. A seat restraint tensioner as set forth in claim 1 wherein said housing comprises a piston portion extending longitudinally and a gas generation portion extending longitudinally from said piston portion, said gas generation portion having a diameter larger than said piston portion.

9. A seat restraint tensioner as set forth in claim 1 wherein said gas generator comprises a pyrotechnic device to expel a gas.

10. A seat restraint tensioner for a seat restraint system in a vehicle comprising:

a base plate for operative connection to vehicle structure and to belt webbing of the seat restraint system;

a housing connected to said base plate;

a movable piston disposed in said housing;

a shaft having a first end connected to said piston and a second end extending through said housing;

at least one pulley rotatably connected to said second end of said shaft and disposed outside of said housing;

a cable fitting for connection to the belt webbing above said base plate;

at least one cable having one end operatively connected to said cable fitting and another end extending over said at least one pulley and operatively connected to said housing; and a gas generator operatively connected to said housing for expelling a gas to push said piston and said second end of said shaft and said at least one pulley, said at least one pulley moving linearly away from said gas generator for pulling on said at least one cable to pull-down the belt webbing toward said base plate.

11. A seat restraint tensioner as set forth in claim 10 wherein said housing comprises a piston portion extending longitudinally and a gas generation portion extending longitudinally from said piston portion, said gas generation portion having a diameter larger than said piston portion.

12. A seat restraint tensioner as set forth in claim 10 wherein said gas generator comprises a pyrotechnic device connected to said housing to expel a gas in said gas generation portion.

13. A seat restraint tensioner as set forth in claim 10 including at least one guide pulley rotatably connected to said base plate, said cable extending around said at least one guide pulley.

14. A seat restraint tensioner as set forth in claim 10 wherein said piston includes an annular groove therein.

15. A seat restraint tensioner as set forth in claim 14 including a seal disposed in said groove to prevent gases from exiting past said piston.

16. A seat restraint tensioner as set forth in claim 10 including a pair of pulleys rotatably attached to said shaft.

17. A seat restraint tensioner as set forth in claim 16 including a pair of guide pulleys attached to said base plate said at least one cable extending through a loop in the belt webbing and over said guide pulleys and said pulleys.

18. A seat restraint system for a vehicle comprising:
- a belt webbing having a first end for connection to either one of a buckle and latch plate and a second end and a loop formed between said first end and said second end;
- a base plate connected to said second end of said belt webbing;
- an anchor bolt extending through said base plate for connection to vehicle structure of the vehicle;
- a housing connected to said base plate;
- a movable piston disposed in said housing;
- a shaft having a first end connected to said piston and a second end extending through said housing;
- a pair of rotatable pulleys connected to said shaft;
- a cable fitting extending through said loop;
- at least one cable operatively connected to said cable fitting and having each end extending over said pulleys and operatively connected to said housing; and
- a gas generator operatively connected to said housing for expelling a gas to push said piston and said second end of said shaft and said pulleys, said pulleys moving linearly away from said gas generator for pulling on said at least one cable to pull-down said belt webbing linearly toward said base plate.

\* \* \* \* \*